United States Patent
Paul

(10) Patent No.: US 9,617,911 B2
(45) Date of Patent: *Apr. 11, 2017

(54) SWITCHOVER VALVE AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 97 days.

This patent is subject to a terminal disclaimer.

(21) Appl. No.: 14/709,594

(22) Filed: May 12, 2015

(65) Prior Publication Data

US 2015/0330298 A1    Nov. 19, 2015

(30) Foreign Application Priority Data

May 13, 2014 (DE) .................. 10 2014 106 715

(51) Int. Cl.
*F02B 75/04* (2006.01)
*F16C 7/06* (2006.01)
*F16K 11/07* (2006.01)

(52) U.S. Cl.
CPC ............. *F02B 75/045* (2013.01); *F16C 7/06* (2013.01); *F16K 11/07* (2013.01); *F16C 2360/22* (2013.01)

(58) Field of Classification Search
CPC ........... F01L 1/3442; F01L 2001/34476; F01L 2001/34426; F02M 21/0269; F16C 7/06; F16K 11/07; F02D 19/0676

USPC ................ 123/48 B, 48 R, 48 A, 78 A, 78 R
See application file for complete search history.

(56) References Cited

U.S. PATENT DOCUMENTS

| | | | | |
|---|---|---|---|---|
| 3,820,558 A | * | 6/1974 | Mueller | ........... F16K 17/10 137/269 |
| 6,463,914 B2 | * | 10/2002 | Augustin | ........... F02M 59/105 123/467 |
| 7,021,254 B2 | * | 4/2006 | Shiraishi | ........... F02B 75/048 123/78 E |
| 7,059,280 B2 | * | 6/2006 | Nohara | ........... F02D 15/02 123/48 D |

(Continued)

FOREIGN PATENT DOCUMENTS

DE    10 2005 055 199    5/2007
DE    10 2010 016 037    9/2011

*Primary Examiner* — Long T Tran
(74) *Attorney, Agent, or Firm* — Gerald E. Hespos; Michael J. Porco; Matthew T. Hespos

(57) ABSTRACT

An internal combustion engine with an adjustable compression ratio has a switchover valve (10) for controlling hydraulic oil flow in chambers of an eccentric adjustment device. The switchover valve (10) has a switching element (12) and a sleeve-shaped connecting section (16) with a first bore (17) that connects to a first hydraulic line (18), a second bore (19) that connects to a second hydraulic line (20), and a venting bore (21) that connects to a vent (22). The switching element (12) can be displaced in the connecting section (16) between a first position (S1) where a groove in the switching element (12) connects the first hydraulic line (18) to the venting duct (22) or a second position (S2) where the groove (14) connects the second hydraulic line (20) to the venting duct (22). A pick-off element (30) extends through the connecting section (16) and interacts with the switching element (12).

12 Claims, 5 Drawing Sheets

(56) References Cited

U.S. PATENT DOCUMENTS 7,066,118 B2 * 6/2006 Hirano .................... F02D 15/02
123/48 B

* cited by examiner

SWITCHOVER VALVE AND INTERNAL COMBUSTION ENGINE

CROSS REFERENCE TO RELATED APPLICATION

This application claims priority under 35 USC 119 to German Patent Appl. No. 10 2014 106 715.0 filed on May 13, 2014, the entire disclosure of which is incorporated herein by reference.

BACKGROUND

1. Field of the Invention

The invention relates to a switchover valve and to an internal combustion engine.

2. Description of the Related Art

The compression ratio of an internal combustion engine defines the ratio between the entire cylinder chamber before compression and the remaining cylinder chamber after compression. A high compression ratio has a positive effect on engine efficiency. Some internal combustion engines, such as Otto-cycle engines, have applied ignition and a fixed compression ratio. Thus, the compression ratio for these engines must be selected to be only so high to prevent so-called "knocking" of the internal combustion engine in full-load operation. However, for the much more commonly occurring part-load range of the internal combustion engine, that is to say in the presence of a low cylinder charge, the compression ratio can have higher values without "knocking" occurring. The important part-load range of an internal combustion engine can be improved if the compression ratio is variably adjustable.

DE 10 2010 016 037 A1 discloses an internal combustion engine with an adjustable compression ratio. The engine has connecting rod with a crankpin bearing eye and a connecting-rod bearing eye. The connecting rod is connectable to a crankshaft by way of the crankpin bearing eye and to a cylinder piston of the internal combustion engine by way of the connecting-rod bearing eye. The connecting rod is assigned an eccentric adjustment device that has an eccentric body and eccentric rods.

The eccentric body of DE 10 2010 016 037 A1 has a piston-pin bore arranged eccentrically with respect to a central point of the connecting-rod bearing eye. The piston-pin bore has a central point and receives a piston pin. The eccentric adjustment device functions to adjust an effective connecting-rod length $I_{eff}$. The connecting rod length is the distance between the central point of the piston-pin bore and a central point of the crankpin bearing eye. The eccentric rods of the eccentric adjustment device are displaceable for rotating the eccentric body and thus varying the effective connecting rod length $I_{eff}$. Each eccentric rod has a piston that is guided displaceably in a hydraulic chamber. A hydraulic pressure prevails in the hydraulic chambers and acts on the pistons assigned to the eccentric rods. Displacement of the eccentric rods is possible or not possible in a manner dependent on the amount of oil in the hydraulic chambers.

The adjustment of the eccentric adjustment device is initiated by the action of inertial and load forces of the internal combustion engine that act on the eccentric adjustment device during a working stroke of the internal combustion engine. The directions of action of the forces acting on the eccentric adjustment device vary constantly during a working stroke. The adjustment movement is assisted by pistons that are acted on by hydraulic oil and that act on the eccentric rods. The pistons prevent a restoring movement of the eccentric adjustment device due to varying directions of action of the forces acting on the eccentric adjustment device. The eccentric rods that interact with the pistons are connected to the eccentric bodies on both sides.

The hydraulic chambers in which the pistons are guided can be charged or filled with hydraulic oil from the crankpin bearing eye via hydraulic oil feed lines. Check valves prevent the hydraulic oil from flowing back from the hydraulic chambers into the hydraulic oil feed lines. A switchover valve is accommodated in a bore of the connecting rod. The hydraulic chambers are in contact via hydraulic oil discharge lines with the bore that accommodates the switchover valve. The switching position of the switchover valve determines which of the hydraulic chambers is filled with hydraulic oil and which of the hydraulic chambers is evacuated, and the adjustment device or direction of rotation of the eccentric adjustment device is dependent on this.

The switchover valve of DE 10 2010 016 037 A1 comprises an actuation element, a restoring spring and a control piston.

As noted above, the hydraulic oil that acts on the pistons that are guided in the hydraulic chambers of the eccentric rods is supplied to the hydraulic chambers from the crankpin bearing eye via the hydraulic oil feed lines. The connecting rod engages on the crankshaft by way of the crankpin bearing eye, and a connecting-rod bearing shell is arranged between a crankshaft journal of the crankshaft and the crankpin bearing eye.

The hydraulic chambers can be vented via the hydraulic oil discharge lines, in a manner dependent on the switching position of the switchover valve. The adjustment direction or direction of rotation of the eccentric adjustment device is dependent on this.

DE 10 2005 055 199 describes an internal combustion engine with an adjustable compression ratio and a connecting rod length that is variably adjustable. The variation of the connecting rod length is realized by way rotation of an eccentric connecting-rod eye. Rotation of the connecting-rod eye is initiated by the action of inertial and gas forces of the internal combustion engine. The rotational movement is assisted by pistons that are acted on with engine oil in the connecting rod. Rotational movement of the eccentric connecting-rod eye is regulated by acting on one of the pistons with engine oil pressure while relieving the other piston of pressure. The pistons are controlled by a 3/2 directional valve that must be actuated mechanically for the switchover. This control involves a cumbersome solution with slotted-guide tracks, switching rods and push rods that are actuated externally, for example, by electric motor means. Thus, comprehensive modifications to the internal combustion engine are required.

The prior art switchover valve enables the direction of adjustment or direction of rotation of the eccentric adjustment device to be influenced in an effective manner. However, there is a demand for a switchover valve that can be manufactured and assembled in a simple manner and that requires little structural space for actuation.

It is an object of the invention to provide a novel switchover valve for an internal combustion engine with an adjustable compression ratio, and an internal combustion engine having a switchover valve of said type.

SUMMARY OF THE INVENTION

The switchover valve according to the invention has a switching element that has a surface formed a groove. The switchover valve of the invention also has a sleeve-shaped connecting section with a first bore that connects the switchover valve to a first hydraulic fluid line, a second bore that connects the switchover valve to a second hydraulic fluid line, and a venting bore that connects the switchover valve to a venting duct. The switching element is arranged in the sleeve-shaped connecting section and can be displaced alternately into a first switching position or a second switching position. The groove in the switching element connects the first hydraulic fluid line to the venting duct when the switching element is in the first position and connects the second hydraulic fluid line to the venting duct when the switching element is in the second position. A pick-off element extends through the sleeve-shaped connecting section in a direction perpendicular to the displacement direction of the switching element in the sleeve-shaped connecting section and interacts with the switching element.

The switchover valve of the invention can be manufactured and assembled in a simple manner and requires little structural space. Furthermore, the switchover valve of the invention can be actuated by the pick-off element in a particularly advantageous manner with a small structural space requirement.

An end of the pick-off element has remote from the switching element may have a ball head for engaging a mechanical actuator in the form of a switching fork. In this way, the pick-off element of the switchover valve advantageously has a relatively small structural space and involves simple manufacture and assembly.

The switching element may be a bolt that is axially displaceable in the sleeve-shaped connecting section and the pick-off element may be a bolt that is connected fixedly to the switching element and that extends displaceably through a groove of the sleeve-shaped connecting section. The groove extends in the axial direction of the sleeve-shaped connecting section. In this way, the pick-off element of the switchover valve involves simple manufacture and assembly and can be actuated in a particularly advantageous manner with a small structural space requirement.

The switchover valve according may have a means for rotational fixing of the switching element. The means for rotational fixing may have a groove in the sleeve-shaped connecting section, and a projection of the switching element may be in the groove. The groove may extend in the axial direction of the sleeve-shaped connecting section and may act as an axial stop of the switching element. Thus, the pick-off element and the groove in which the pick-off element is displaceable may form the means for rotational fixing of the switching element. In this way, the pick-off element enables the switchover valve to be actuated in a particularly advantageous manner with a small structural space requirement.

Exemplary embodiments of the invention are explained in more detail on the basis of the drawings, without the invention being restricted to those embodiments.

DETAILED DESCRIPTION OF THE PREFERRED EMBODIMENTS

Figure 1:
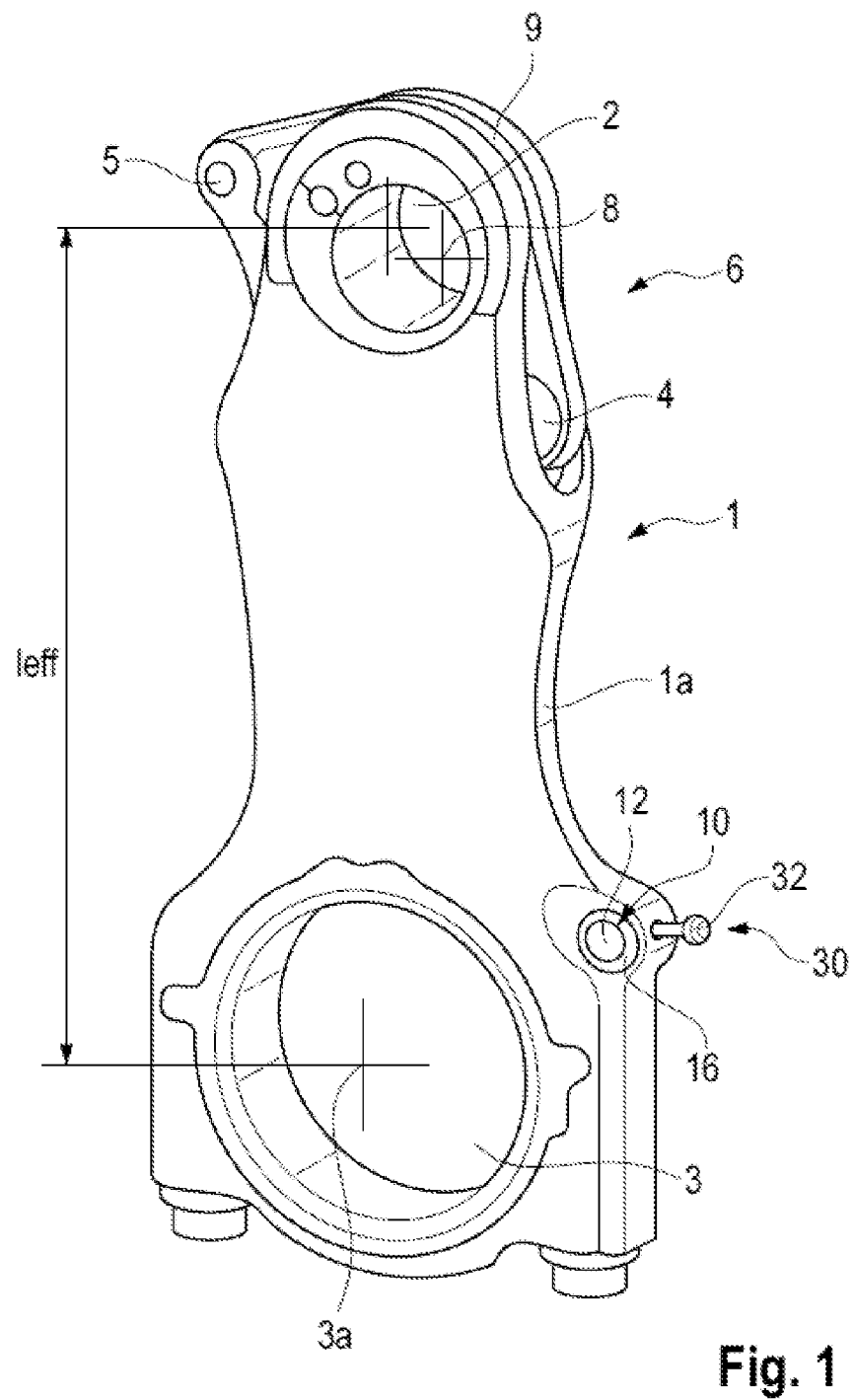
FIG. 1 shows a detail of an internal combustion engine with adjustable compression ratio, specifically a connecting rod arrangement having a switchover valve according to the invention.
Figure 2:
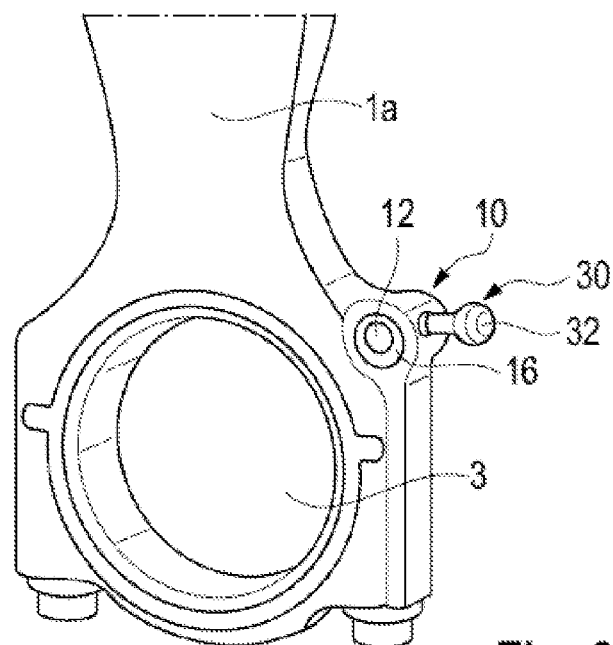
FIG. 2 shows a detail of FIG. 1 in the region of the switchover valve.
Figure 3:
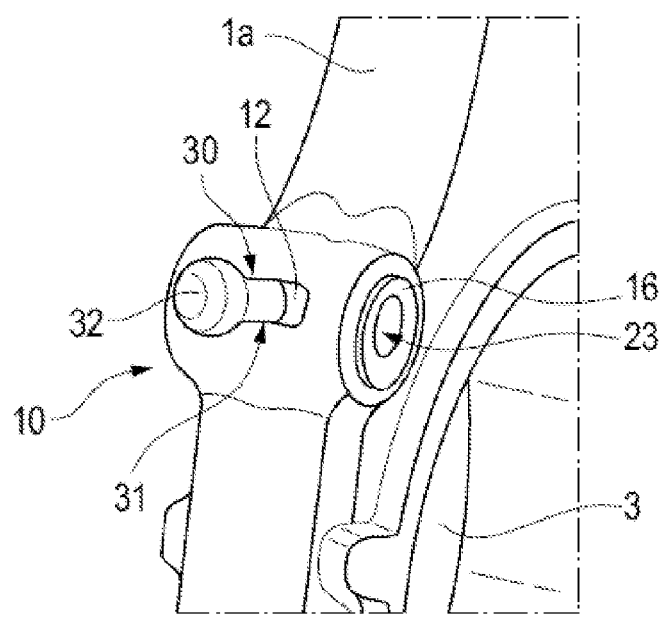
FIG. 3 shows a further detail of FIG. 1 in the region of the switchover valve.

A connecting rod arrangement of an internal combustion engine according to an embodiment is identified generally by the numeral 1 in FIG. 1. The connecting rod arrangement 1 has a connecting rod 1a and a hydraulically adjustable eccentric adjustment device 6 is arranged at least in sections in a connecting-rod bearing eye 2.

The eccentric adjustment device 6 has a piston-pin bore that is arranged eccentrically with respect to a central axis 8 of the connecting-rod bearing eye 2. The piston-pin bore has a central axis 3a that receives a piston pin. The eccentric adjustment device 6 is used for adjusting an effective connecting rod length $l_{\mathit{eff}}$.

Rotation of the adjustable eccentric adjustment device 6 is initiated by inertial and load forces of the internal combustion engine that act on the eccentric device 6 during a working stroke of the internal combustion engine. The directions of the forces acting on the eccentric device 6 vary constantly during a working stroke. The rotational movement or adjustment movement is assisted by the pistons that integrated in the connecting rod arrangement 1. The pistons are acted on by hydraulic fluid, in particular engine oil, or prevent a restoring movement of the eccentric adjustment device 6 due to varying directions of action of the forces acting on the eccentric adjustment device 6.

Eccentric rods 4, 5 operatively connect the pistons to an eccentric body 9 of the eccentric adjustment device 6 on both sides. The eccentric adjustment device 6 may have the pistons, the eccentric rods 4, 5 and the eccentric body 9. The pistons are acted on with hydraulic fluid from the crankpin bearing eye 3 via hydraulic fluid lines and check valves, not shown in FIG. 1. In this case, the check valves prevent the hydraulic fluid from flowing back from the piston volumes of the pistons into the hydraulic fluid lines and to an engine interior of the internal combustion engine.

Figure 4:
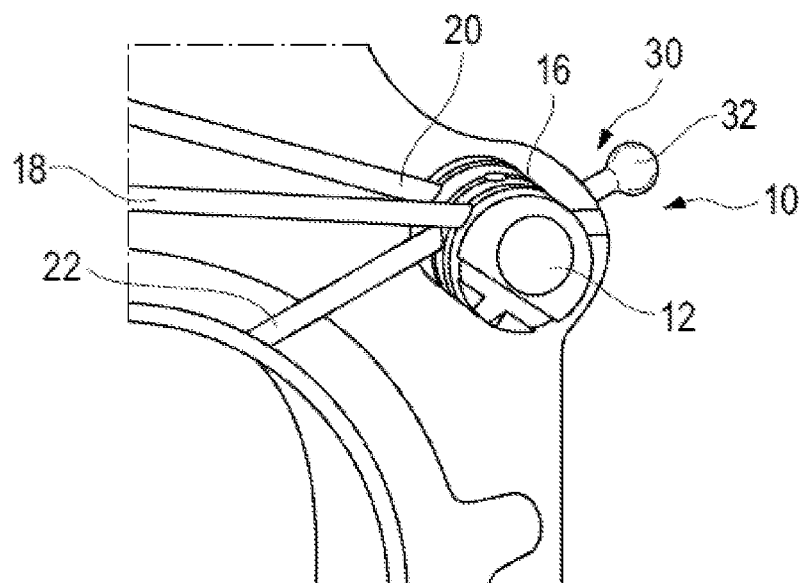
FIG. 4 shows a further detail of FIG. 1 in the region of the switchover valve.

The piston volumes are connected to first and second hydraulic fluid lines 18 and 20 that interact with a switchover valve 10 (see FIG. 4).

FIG. 4 shows a schematic detail view of an embodiment of the switchover valve 10 installed in the connecting rod arrangement. The switchover valve 10 has a switching element 12 and a sleeve-shaped connecting section 16. The switching element 12 is arranged in a cavity 23 of the sleeve-shaped connecting section 16. The switching element 12 and the sleeve-shaped connecting section 16 preferably are cylindrical.

The sleeve-shaped connecting section 16 has a first bore 17 connected to the first hydraulic fluid line 18, a second bore 19 connected to the second hydraulic fluid line 20 and a venting bore 21 connected to a venting duct 22.

Figure 6:
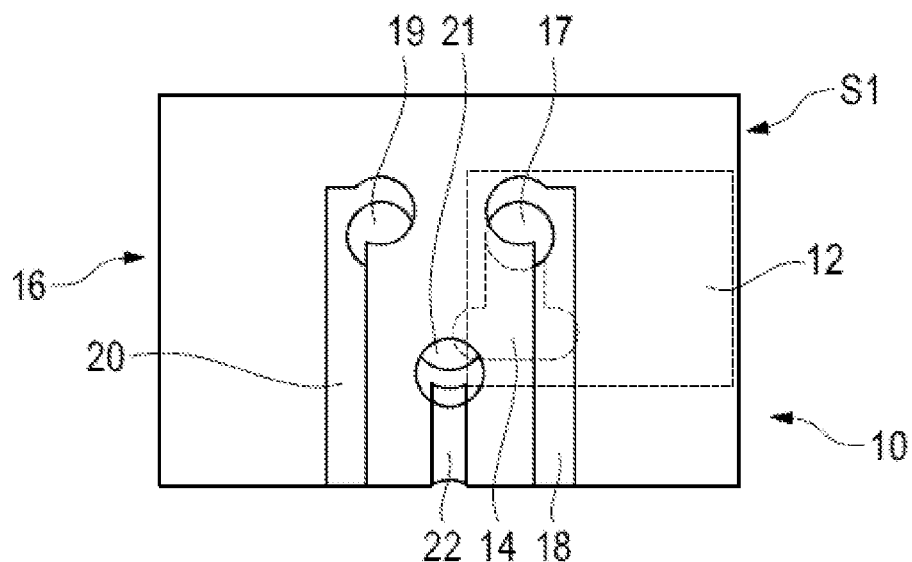
FIG. 6 is a schematic illustration of the switchover valve in a first position.

FIG. 6 schematically illustrates the switchover valve 10 for controlling the hydraulic fluid flow in the first switching position S1. The switchover valve 10 has the switching element 12 and the sleeve-shaped connecting section 16. The switching element 12 is inserted fully into the cavity 23 of the sleeve-shaped connecting section 16. A T-shaped groove 14 is formed in the surface of the switching element 12.

The sleeve-shaped connecting section 16 has the first bore 17 that connects the switchover valve 10 to the first hydraulic fluid line 18, the second bore 19 for connecting the switchover valve 10 to the second hydraulic fluid line 20 and the venting bore 21 for connecting the switchover valve 10 to the venting duct 22.

In the first switching position S1, the groove 14 formed in the surface of the switching element 12 is arranged in the region of the first bore 17 and the venting bore 21. Thus, the hydraulic fluid line 18 that is connected to the first bore 17 can be vented.

Figure 7:
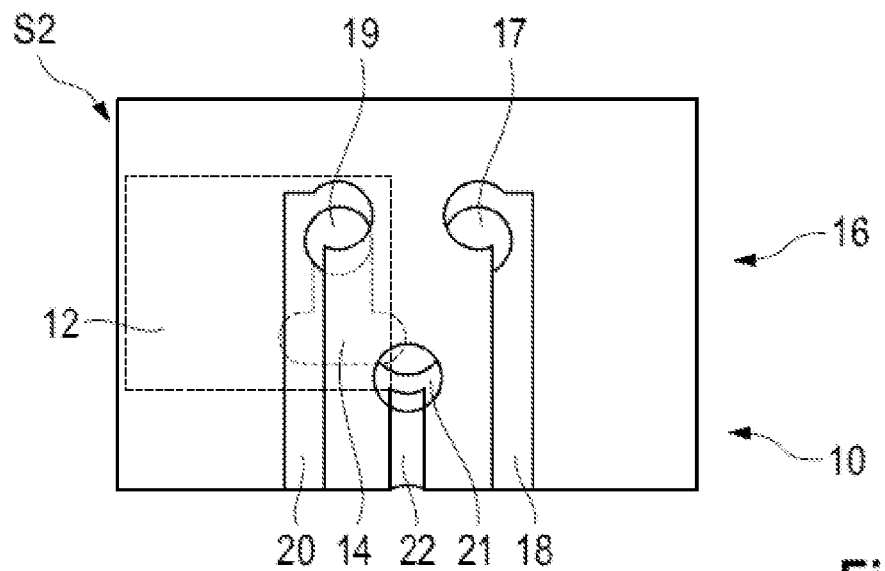
FIG. 7 is a schematic illustration of the switchover valve in a second position.
Figure 8:
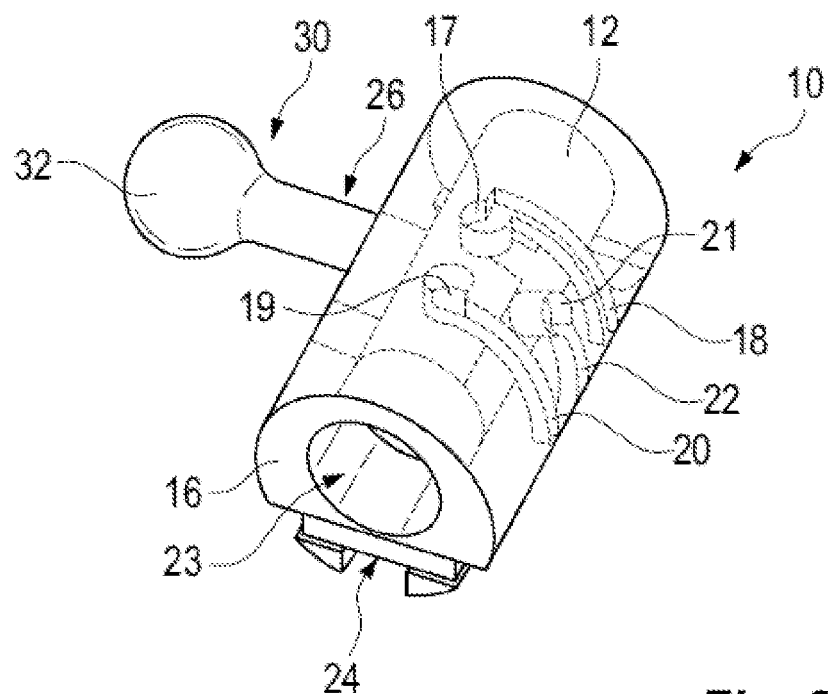
FIG. 8 is a further perspective view of the switchover valve.

FIG. 7 schematically illustrates the switchover valve in a second switching position S2 where the groove 14 formed in the surface of the switching element 12 is arranged in the region of the second bore 19 and the venting bore 21. Thus, the hydraulic fluid line 20 that is connected to the second bore 19 can be vented.

The venting bore 21 is offset circumferentially from the first and second bores 17, 19 and is arranged axially between the first and the second bores 17, 19 of the sleeve-shaped connecting section 16.

The switching element 12 of the switchover valve 10 is in the form of a bolt that is axially displaceable in the cavity 23 of the sleeve-shaped connecting section 16.

A pick-off element 30 extends out through the sleeve-shaped connecting section 16 in a direction approximately perpendicular to the axial direction of displacement of the switching element 12 in the connecting section 16. The pick-off element 30 interacts with a central section of the switching element 12

The pick-off element 30 can be actuated mechanically by a mechanical actuator (not shown) that engages the pick-off element 30 for displacing the switching element 12 between the two switching positions S1 and S2. The mechanical actuator preferably is in the form of a switching fork.

Figure 5:
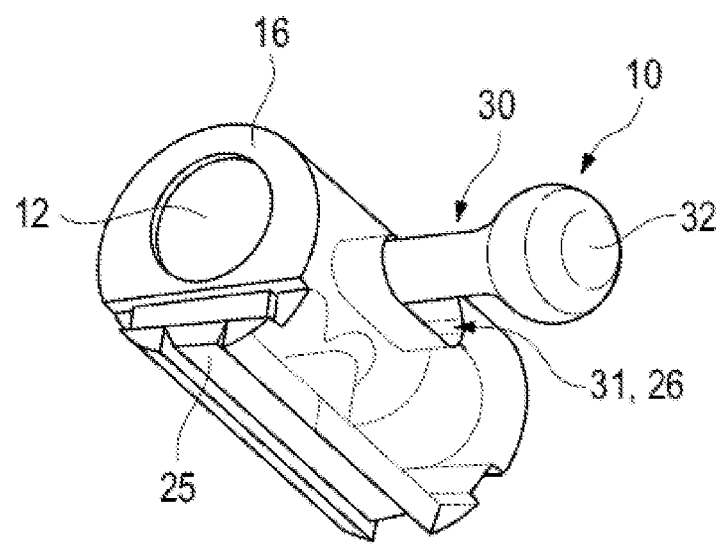
FIG. 5 is a perspective view of the switchover valve.

The pick-off element 30 is in the form of a bolt and is connected fixedly to the bolt-like switching element 12. The bolt-like pick-off element 30 extends through a groove 31 of the sleeve-shaped connecting section 16 (see FIG. 5). The groove extends in the axial direction of the sleeve-shaped connecting section 16, and is guided displaceably in the groove 31 along the axial direction of displacement of the switching element 12.

An end of the pick-off element 30 remote from the switching element 12 projects out of the groove 31 and has a bolt head 32 for engaging the mechanical actuator.

Figure 9:
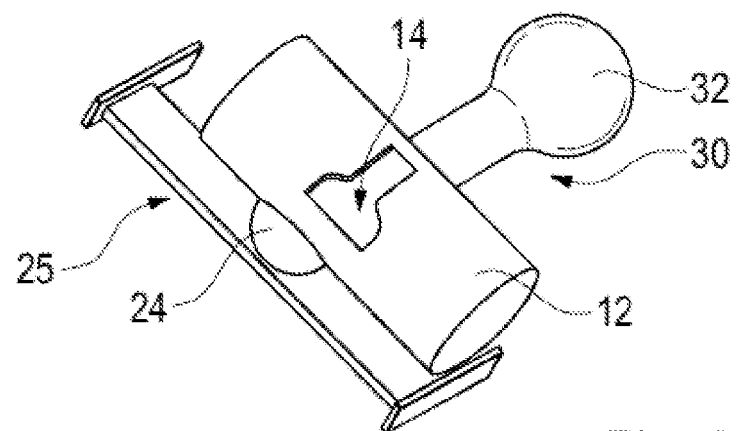
FIG. 9 is a detail of the switchover valve from FIGS. 5 and 8.

The switching element 12 of the switchover valve 10 is locked with detent action in the respective switching position by a detent ball 24 and a spring 25, such as a leaf spring, as shown in FIG. 9. The detent ball 24 and the spring 25 interact with a detent groove (not shown) in the switching element 12. Two detent grooves are provided, one for each of the switching positions S1 and S2. The spring 25 exerts a spring load on the detent ball 24 perpendicular to the displacement direction of the switching element 12.

A sealing gap formed in the region of respective bores 17, 19, 21, between the sleeve-shaped connecting section 16 and the switching element 12 can be sealed off in liquid-tight fashion under the action of a contact pressure generated by the spring 25.

The switchover valve 10 has a means for rotational fixing 26 formed in the axial direction of the sleeve-shaped connecting section 16. The means for rotational fixing 26 is a groove extending in the axial direction of the sleeve-shaped connecting section. A projection of the switching element is arranged in the groove. Thus, the groove serves both as a means for rotational fixing of the switching element 12 and also as an axial stop of the switching element 12. In the illustrated first variant, the pick-off element 30 is displaceable in the groove 31 and forms the means for rotational fixing 26 of the switching element 12. In this case, the bolt-like pick-off element 30 provides the projection that is guided in the groove 31 of the switching element for the means for rotational fixing 26.

In a second unillustrated variant, the pick-off element 30 and the groove 31 of the sleeve-shaped connecting section 16 that displaceably receives the pick-off element 30 is formed as a separate assembly from the means for rotational fixing the switching element 12. Thus, the switching element 12 has a separate projection in addition to the bolt-like pick-off element 30. The separate projection is the means for rotational fixing 26 and engages into a separate groove.

An internal combustion engine according to the invention has multiple such connecting rod arrangements 1 that have a hydraulically adjustable eccentric adjustment device 6 arranged in a connecting-rod bearing eye 2 and/or in a crankpin bearing eye 3 and that function for adjusting an effective connecting rod length $l_{eff}$.

Each connecting rod arrangement 1 comprises a switchover valve 10, and an adjustment travel of the respective eccentric adjustment device 6 can be controlled by the respective switchover valve 10.

The respective switchover valve 10 preferably is integrated into the respective connecting rod arrangement 1 in a region of the crankpin bearing eye 3.

The invention is not restricted to the exemplary embodiments above. Rather, the switchover valve 10 of the invention may also be embodied in some way other than that specifically described above.

The switchover valve 10 of the invention can be manufactured and assembled in a simple manner and requires little structural space.

The switchover valve 10 can be actuated by the pick-off element 30 in a particularly advantageous manner with a small structural space requirement. A mechanical actuator, such as a switching fork, merely has to engage around the ball head 32 of the pick-off element 30, and not around the entire switching element 12.

What is claimed is:
1. A switchover valve for an internal combustion engine that has an adjustable compression ratio for controlling a hydraulic oil flow in hydraulic chambers of an eccentric adjustment device, comprising:
   a sleeve-shaped connecting section having a first bore that connects the switchover valve to a first hydraulic fluid line, a second bore, that connects the switchover valve to a second hydraulic fluid line, and a venting bore that connects the switchover valve to a venting duct;
   a switching element arranged in the sleeve-shaped connecting section and being displaceable alternately into a first switching position where a groove in the switching element connects the first hydraulic fluid line to the venting duct and a second switching position where the groove in the switching element connects the second hydraulic fluid line to the venting duct; and
   a pick-off element extending perpendicular to a direction of displacement of the switching element in the sleeve-shaped connecting section and that extends through the sleeve-shaped connecting section and interacts with the switching element.

2. The switchover valve of claim 1, wherein the pick-off element engages on a central section of the switching element.

3. The switchover valve of claim 1, wherein an end of the pick-off element remote from the switching element has a ball head for engaging an actuator.

4. The switchover valve of claim 1, wherein the switching element is in the form of a bolt that is axially displaceable in the sleeve-shaped connecting section, and the pick-off element is a bolt that is connected fixedly to the switching element and extends outward through a groove of the sleeve-shaped connecting section, the groove extending in an axial direction of the sleeve-shaped connecting section and being displaceable in the groove.

5. The switchover valve of claim 1, further comprising means for rotational fixing of the switching element that comprises a groove formed in the sleeve-shaped connecting section and in which there is arranged a projection of the switching element, the groove extending in the axial direction of the sleeve-shaped connecting section and acting as an axial stop of the switching element.

6. The switchover valve of claim 5, wherein the pick-off element and the groove in the sleeve-shaped connecting section in which groove the pick-off element is displaceable are formed as a first assembly, and the means for rotational fixing of the switching element is a second assembly.

7. The switchover valve of claim 5, wherein the pick-off element and the groove in which the pick-off element is displaceable form the means for rotational fixing of the switching element.

8. The switchover valve of claim 1, wherein the groove in the switching element is T-shaped, the groove in the first switching position is in a region of the first bore and of the venting bore of the sleeve-shaped connecting section and, in the second switching position is arranged in a region of the second bore and of the venting bore of the sleeve-shaped connecting section, and the venting bore is arranged in a region between the first and second bores of the sleeve-shaped connecting section.

9. The switchover valve of claim 1, wherein the switching element is lockable with detent action in the first and second switching position by a detent ball and a spring that interact with detent grooves in the switching element, wherein the spring is designed to exert a spring load on the detent ball perpendicular to the displacement direction of the switching element.

10. The switchover valve of claim 9, wherein the spring exerts a contact pressure for achieving a liquid-tight seal of a gap between the sleeve-shaped connecting section and the switching element in the region of bores.

11. An internal combustion engine that has an adjustable compression ratio, the internal combustion engine comprising the switchover valve of claim 1; and a connecting rod arrangement that has a hydraulically adjustable eccentric adjustment device arranged in a connecting-rod bearing eye and a crankpin bearing eye, the switchover valve being operative for adjusting of an effective connecting rod length ($l_{eff}$), wherein an adjustment travel of the eccentric adjustment device can be controlled by the switchover valve.

12. The internal combustion engine of claim 11, wherein the switchover valve is integrated into the connecting rod arrangement in a region of the crankpin bearing eye.

* * * * *